(12) United States Patent
Park et al.

(10) Patent No.: US 9,590,267 B2
(45) Date of Patent: Mar. 7, 2017

(54) ELECTROLYTE FOR RECHARGEABLE LITHIUM BATTERY AND RECHARGEABLE LITHIUM BATTERY INCLUDING SAME

(71) Applicant: Samsung SDI Co., Ltd., Yongin-si, Gyeonggi-do (KR)

(72) Inventors: Na-Rae Park, Yongin-si (KR); Jin-Hyunk Lim, Yongin-si (KR); Mi-Hyeun Oh, Yongin-si (KR)

(73) Assignee: SAMSUNG SDI CO., LTD., Yongin, Gyeonggi-do (KR)

( * ) Notice: Subject to any disclaimer, the term of this patent is extended or adjusted under 35 U.S.C. 154(b) by 480 days.

(21) Appl. No.: 13/799,000

(22) Filed: Mar. 13, 2013

(65) Prior Publication Data

US 2014/0065493 A1    Mar. 6, 2014

(30) Foreign Application Priority Data

Aug. 29, 2012    (KR) .................. 10-2012-0095153

(51) Int. Cl.
| | | |
|---|---|---|
| H01M 10/056 | (2010.01) | |
| H01M 6/16 | (2006.01) | |
| H01M 10/052 | (2010.01) | |
| H01M 10/0567 | (2010.01) | |
| H01M 10/0569 | (2010.01) | |

(52) U.S. Cl.
CPC ......... *H01M 10/056* (2013.01); *H01M 6/162* (2013.01); *H01M 6/168* (2013.01); *H01M 10/052* (2013.01); *H01M 10/0567* (2013.01); *H01M 10/0569* (2013.01); *H01M 2300/004* (2013.01); *Y02E 60/122* (2013.01)

(58) Field of Classification Search
CPC .............................. H01M 6/162; H01M 6/168
USPC .......................................................... 429/343
See application file for complete search history.

(56) References Cited

U.S. PATENT DOCUMENTS

| | | |
|---|---|---|
| 6,492,064 B1 | 12/2002 | Smart et al. |
| 6,541,162 B1 | 4/2003 | Song et al. |
| 7,235,334 B2 | 6/2007 | Kim et al. |

(Continued)

FOREIGN PATENT DOCUMENTS

| | | |
|---|---|---|
| CN | 101939874 A | 1/2011 |
| CN | 102332607 A | 1/2012 |

(Continued)

OTHER PUBLICATIONS

Office Action dated Oct. 6, 2014, issued in corresponding European Patent Application No. 13180861.0.

(Continued)

*Primary Examiner* — Basia Ridley
*Assistant Examiner* — James Erwin
(74) *Attorney, Agent, or Firm* — Knobbe Martens Olson & Bear LLP (57) ABSTRACT

Disclosed are a non-aqueous electrolyte for a rechargeable lithium battery and a rechargeable lithium battery including the non-aqueous electrolyte, and the non-aqueous electrolyte for a rechargeable lithium battery includes a lithium salt; a non-aqueous organic solvent; and trialkylsilyl borate as an additive, wherein the non-aqueous organic solvent may include a solvent having a low melting point of less than or equal to about −50° C. and ionic conductivity of greater than or equal to about 6 mS/cm at 25° C.

18 Claims, 4 Drawing Sheets

(56) References Cited

U.S. PATENT DOCUMENTS

| | | | |
|---|---|---|---|
| 2005/0031963 A1* | 2/2005 | Im | H01M 10/0569 |
| | | | 429/332 |
| 2008/0118843 A1* | 5/2008 | Tarnopolsky | H01M 4/13 |
| | | | 429/332 |
| 2009/0098456 A1* | 4/2009 | Park et al. | 429/200 |
| 2011/0027663 A1 | 2/2011 | Ohkubo et al. | |

FOREIGN PATENT DOCUMENTS

| | | |
|---|---|---|
| DE | 102010013293 A1 | 9/2011 |
| EP | 2355213 A2 | 8/2011 |
| EP | 2498329 A1 | 9/2012 |
| JP | 2007-141831 A | 6/2007 |
| KR | 2000-0040642 | 7/2000 |
| KR | 10-2005-0063915 A | 6/2005 |
| KR | 1020050121172 | 12/2005 |
| KR | 1020070082927 A | 8/2007 |

OTHER PUBLICATIONS

European Office Action dated Nov. 4, 2013, issued by the European Patent Office in European Patent Application No. 13 180 861.0 , in 4 pages.

Partial European Search Report dated Jan. 16, 2014, issued in connection with corresponding European Patent Application No. 13180861.0.

Office Actions mailed Apr. 13, 2015, issued in corresponding European Patent Application No. 13180861.0.

Office Action mailed Jun. 30, 2016, issued in corresponding CN Application No. 201310384658.2.

Office Action dated Dec. 12, 2016, issued in corresponding CN Application No. 201310384658.2.

* cited by examiner

ELECTROLYTE FOR RECHARGEABLE LITHIUM BATTERY AND RECHARGEABLE LITHIUM BATTERY INCLUDING SAME

CROSS-REFERENCE TO RELATED APPLICATIONS

This application claims priority to and the benefit of Korean Patent Application No. 10-2012-0095153 filed in the Korean Intellectual Property Office on Aug. 29, 2012, the entire contents of which are incorporated herein by reference.

BACKGROUND

Field

This disclosure relates to a non-aqueous electrolyte for a rechargeable lithium battery and a rechargeable lithium battery including the same.

Description of the Related Art

A rechargeable lithium battery has recently drawn attention as a power source for a small portable electronic device. It uses an organic electrolyte solution and thereby, has twice or more high discharge voltage than that of a conventional battery using an alkali aqueous solution and as a result, has high energy density.

The organic electrolyte solution for a rechargeable lithium battery consists of a lithium salt such as $LiPF_6$ and the like and an organic solvent. The organic solvent is required of low reactivity with lithium, minimized internal resistance for smoothly moving lithium ions, thermal stability within a vast temperature range, high compatibility with a negative active material, and a high dielectric constant enough to dissolve the large amount of the lithium salt. Examples of the organic solvent may mainly include cyclic carbonate such as propylene carbonate (PC), ethylene carbonate (EC), and the like; or linear carbonate such as dimethylcarbonate (DMC), diethyl carbonate (DEC), and the like and additionally, a hydrocarbon-based solvent such as 1,2-dimethoxyethane, diethoxyethane, and the like.

The PC among the organic solvents has a low melting point of about −49° C. and thus, excellent low temperature characteristic and also, has good compatibility with amorphous-based carbon and a high dielectric constant and thus, may dissolve the large amount of inorganic lithium salt. However, the PC has high viscosity and is inserted between carbon layers of a negative electrode during the charge when used with a crystalline carbon-based negative active material such as graphite and then, decomposed and thus, produces propylene gas and lithium carbonate, decreases capacity, and increases irreversible capacity. This irreversible capacity may be primarily caused by structural characteristic of carbon and vary depending on a degree that an electrolyte solution is reduced on the side where the carbon contacts with lithium and a degrees that a proactive layer of an electrolyte solution is formed on the surface of the carbon. On the other hand, the EC does not react with a graphite-based negative active material and may be easily applied to a battery using crystalline carbon as a negative electrode and also, has a high dielectric constant and thus, may dissolve the large amount of a lithium salt. However, the EC has high viscosity and a high melting point of about 36° C. and thus, may not secure a low temperature performance.

In addition, the linear carbonate such as DMC, DEC, and the like has low viscosity and is easily intercalated among negative active materials and may decrease irreversible capacity of the battery and also, has small reactivity with lithium but a low dielectric rate and thus, may not dissolve the large amount of a lithium salt. Particularly, the DMC has high electric conductivity and thus, may be applied to a battery with a high current and a high voltage but has a high melting point (about 4.6° C.) and thus, bad low temperature characteristic. In addition, the organic solvent such as dimethylformamide, acetonitrile, and the like has a high dielectric constant but high reactivity with lithium and accordingly, may not be substantially used.

Accordingly, a method of variously adding at least one organic solvent to an electrolyte, for example, adding the DEC having good low temperature characteristic to the EC/DEC has been suggested in order to complement drawback of each electrolyte solvent but still has a problem of insufficiently improving low temperature characteristic, having a low temperature of decomposing an active material, and hardly securing safety.

SUMMARY

One embodiment provides a non-aqueous electrolyte for a rechargeable lithium battery that may improve discharge characteristic of a rechargeable lithium battery at a low temperature and increase safety, reliability, and cycle-life characteristic of the rechargeable lithium battery.

Another embodiment provides a rechargeable lithium battery including the non-aqueous electrolyte.

According to one embodiment, the non-aqueous electrolyte for a rechargeable lithium battery includes a lithium salt; a non-aqueous organic solvent; and trialkylsilyl borate as an additive. The non-aqueous organic solvent may include a solvent having a low melting point of less than or equal to about −50° C. and ionic conductivity of greater than or equal to about 6 mS/cm at 25° C.

The solvent having a low melting point may be selected from alkylacetate, alkylpropionate, and a mixture thereof.

The solvent having a low melting point may be selected from methylacetate, ethylacetate, propylacetate, butylacetate, dimethylacetate, methylpropionate, ethylpropionate, propylpropionate, butylpropionate, and a mixture thereof.

The solvent having a low melting point may be included in an amount of about 10 wt % to about 70 wt % based on the total weight of the non-aqueous organic solvent.

The trialkylsilyl borate may be trimethylsilyl borate.

The trialkylsilyl borate may be included in an amount of about 0.1 wt % to about 5 wt % based on the total weight of the non-aqueous electrolyte.

According to another embodiment, a rechargeable lithium battery including the non-aqueous electrolyte is provided.

Other embodiments are described in the detailed description.

Accordingly, the non-aqueous electrolyte for a rechargeable lithium battery according to the present embodiments may improve discharge characteristic of a rechargeable lithium battery at a low temperature and increase safety, reliability, and cycle-life characteristic of the rechargeable lithium battery.

DETAILED DESCRIPTION OF THE PREFERRED EMBODIMENT

Example embodiments of this disclosure will hereinafter be described in detail. However, these embodiments are only examples, and this disclosure is not limited thereto.

As used herein, when a specific definition is not otherwise provided, the term "alkyl group" may refer to a $C_1$ to $C_7$ alkyl group, and for example, methyl, ethyl, propyl, isopropyl, pentyl, hexyl, heptyl, and the like.

Recently, a rechargeable lithium battery has been used in various climate surroundings. The rechargeable lithium battery requires discharge characteristic at an extremely low temperature. However, the rechargeable lithium battery may have an electrolyte frozen at a temperature of less than or equal to about −20° C. or has sharply deteriorated discharge voltage due to increased resistance and resultantly, may stop operation of a digital camera or a mobile phone.

Accordingly, one embodiment provides a non-aqueous electrolyte including a solvent having a lower melting point and higher ionic conductivity than a conventional carbonate-based solvent and thus, preventing a battery from being frozen at an extremely low temperature and also, increasing discharge capacity of the battery at an extremely low temperature due to high ionic conductivity. In addition, the non-aqueous electrolyte includes trimethylsilyl borate having excellent ionic conductivity and forms a stable layer on the surface of positive and negative active materials and thus, may suppress internal resistance of the battery and prevent initial discharge voltage deterioration during the low temperature discharge and also, prevent cycle-life deterioration caused by only a solvent having a low melting point and thus, improve long-term cycle-life characteristic.

In other words, the non-aqueous electrolyte for a rechargeable lithium battery according to one embodiment includes a lithium salt; a non-aqueous organic solvent; and trialkylsilyl borate as an additive. The non-aqueous organic solvent may include a solvent having a low melting point of less than or equal to about 50° C. and ionic conductivity of greater than or equal to about 6 mS/cm at about 25° C.

Hereinafter, each component is described in detail.

Lithium Salt

The lithium salt is dissolved in the non-aqueous organic solvent and supplies lithium ions in a rechargeable lithium battery, and basically operates the rechargeable lithium battery and improves lithium ion transfer between positive and negative electrodes. The lithium salt includes $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis (oxalato) borate, LiBOB), or a mixture thereof, which is used as a supporting electrolytic salt.

The lithium salt may be used at a concentration of about 0.1 M to about 2.0M. When the lithium salt is included within the above concentration range, it may electrolyte performance and lithium ion mobility due to optimal electrolyte conductivity and viscosity.

Non-Aqueous Organic Solvent

The non-aqueous organic solvent plays a role of transmitting ions taking part in the electrochemical reaction of a battery.

According to one embodiment, a non-aqueous organic solvent includes a solvent having a low melting point of less than or equal to about −50° C. and ionic conductivity of greater than or equal to about 6 mS/cm at about 25° C. The solvent having a low melting point may have a melting point from about −120° C. to about −50° C. and ionic conductivity from about 6 mS/cm to about 11 mS/cm at about 25° C. When the non-aqueous organic solvent has a melting point and ionic conductivity within the above ranges, the non-aqueous electrolyte may not be frozen at a low temperature and improve conductivity of lithium ions. Accordingly, when applied to a rechargeable lithium battery, the electrolyte may improve discharge capacity at a low temperature.

The solvent having a low melting point may be selected from the group consisting of an alkylacetate, an alkylpropionate, and a mixture thereof and for example, methylacetate, ethylacetate, propylacetate, butylacetate, dimethylacetate, methylpropionate, ethylpropionate, propylpropionate, butylpropionate, and a mixture thereof. In the alkylacetate and the alkylpropionate, the alkyl is a $C_1$ to $C_{15}$ alkyl. The alkyl may include ethylacetate, ethylpropionate, or a mixture thereof.

The solvent having a low melting point may be included in an amount from about 10 wt % to about 70 wt % based on the total weight of the non-aqueous organic solvent. When the solvent having a low melting point is included within the range, low temperature characteristic of a battery may be improved.

According to one embodiment, a non-aqueous organic solvent may include a carbonate-based, ester-based, ether-based, ketone-based, alcohol-based, or non-protonic solvent conventionally used as a non-aqueous organic solvent for a rechargeable lithium battery as well as the solvent having a low melting point.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran and the like, and the ketone-based solvent may include cyclohexanone, and the like. The alcohol-based solvent may include ethanol, isopropyl alcohol, and the like. The aprotic solvent include nitriles such as R-CN (wherein R is a $C_2$ to $C_{20}$ linear, branched, or cyclic hydrocarbon group, and may include a double bond, an aromatic ring, or an ether bond), amides such as dimethylformamide, dimethylacetamide, dioxolanes such as 1,3-dioxolane, sulfolanes, and the like.

The non-aqueous organic solvent may be used singularly or in a mixture. When the organic solvent is used in a mixture, its mixture ratio may be controlled in accordance with desirable performance of a battery.

The carbonate-based solvent may include a mixture of a cyclic carbonate and a linear carbonate. The cyclic carbonate and the linear carbonate are mixed together in a volume ratio of about 1:1 to about 1:9, which may enhance performance of an electrolyte.

In addition, the non-aqueous organic solvent may be prepared by further adding the aromatic hydrocarbon-based solvent to the carbonate-based solvent. The carbonate-based solvent and the aromatic hydrocarbon-based solvent are mixed together in a volume ratio of about 1:1 to about 30:1.

The aromatic hydrocarbon-based organic solvent may be an aromatic hydrocarbon-based compound represented by the following Chemical Formula 1:

[CHEMICAL FORMULA 1]

In Chemical Formula 1, $R_a$ to $R_f$ are each independently selected from hydrogen, a halogen, a $C_1$ to $C_{10}$ alkyl group, a $C_1$ to $C_{10}$ haloalkyl group, and a combination thereof.

The aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a mixture thereof.

The non-aqueous electrolyte may further include vinylene carbonate, an ethylene carbonate-based compound represented by the following Chemical Formula 2, or a combination thereof to improve cycle-life.

[CHEMICAL FORMULA 2]

In Chemical Formula 2, $R_g$ and $R_h$ are each independently hydrogen, a halogen, a cyano group (CN), a nitro group ($NO_2$), or a $C_1$ to $C_5$ fluoroalkyl group, provided that at least one of $R_g$ and $R_h$ is a halogen, a cyano group (CN), a nitro group ($NO_2$), or a $C_1$ to $C_5$ fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The vinylene carbonate or the ethylene carbonate-based compound may be controlled regarding the amount to improve cycle life may be adjusted within an appropriate range.

Additive

According to one embodiment, a non-aqueous electrolyte includes trialkylsilyl borate as an additive to increase ionic conductivity.

In the trialkylsilyl borate, an alkyl may be a $C_1$ to $C_7$ alkyl and for example, trimethylsilyl borate and the like.

The trialkylsilyl borate may be included in an amount of about 0.1 wt % to about 5 wt % and for example, about 0.1 wt % to about 3 wt % based on the total weight of the non-aqueous electrolyte. When the trialkylsilyl borate is included within the range, the non-aqueous electrolyte may have excellent ionic conductivity.

According to the embodiment, the non-aqueous electrolyte has the aforementioned structure and thus, may improve discharge characteristic of a rechargeable lithium battery at a low temperature and increase safety, reliability, and cycle-life characteristic of the rechargeable lithium battery.

According to another embodiment, a rechargeable lithium battery including the non-aqueous electrolyte is provided.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, and may be thin film batteries or may be rather bulky in size. The structure and the manufacturing method of these batteries are well known in a related field and will not be described in detail.

Figure 1:
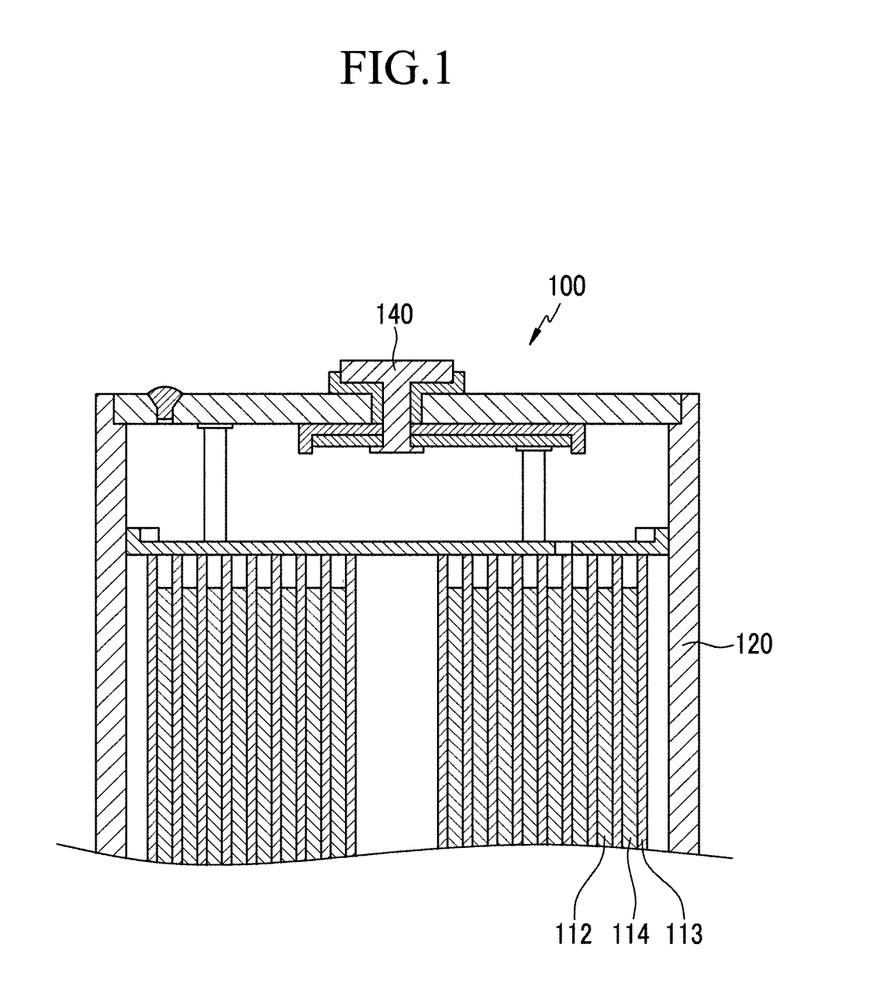
FIG. 1 is a schematic view showing a rechargeable lithium battery according to one embodiment.

FIG. 1 is an exploded perspective view showing a rechargeable lithium battery in accordance with an embodiment. Referring to FIG. 1, the rechargeable lithium battery 100 is formed with a cylindrical shape and includes a negative electrode 112, a positive electrode 114, a separator 113 disposed between the a positive electrode 114 and negative electrode 112, an electrolyte (not shown) impregnated in the negative electrode 112, the positive electrode 114, and the separator 113, a battery case 120, and sealing member 140 sealing the battery case 120. The rechargeable lithium battery 100 is fabricated by sequentially stacking a negative electrode 112, a positive electrode 114, and separator 113, and spiral-winding them and housing the wound product in the battery case 120.

The negative electrode 112 includes a current collector and a negative active material layer formed on the current collector, and the negative active material layer includes the negative active material.

The negative active material includes a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes carbon materials. The carbon material may be any generally-used carbon-based negative active material in a lithium ion rechargeable battery. Examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ ($0<x<2$), a $Si$—$X_1$ alloy (wherein $X_1$ is an element selected from the group consisting of an alkali metal, an alkaline-earth metal, Group 13 to 16 elements, a transition element, a rare earth element, and a combination thereof, and not Si), Sn, $SnO_2$, Sn—$X_2$ alloy (wherein $X_2$ is an element selected from the group consisting of an alkali metal, an alkaline-earth metal, Group 13 to 16 elements, a transition element, a rare earth element, and combinations thereof and is not Sn), and the like. The $X_1$ and $X_2$ may be an element of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include vanadium oxide, lithium vanadium oxide, and the like.

The negative active material layer may include and optionally a conductive material.

The binder improves binding properties of the negative active material particles to one another and to a current collector. Examples of the binder include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of a negative electrode. Any electrically conductive material can be used as a conductive agent, unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be a copper foil, a nickel foil, a stainless steel foil, a titanium foil, a nickel foam, a copper foam, a polymer substrate coated with a conductive metal, or combinations thereof.

The positive electrode 114 includes a current collector and a positive active material layer disposed on the current collector.

The positive active material includes lithiated intercalation compounds that reversibly intercalate and deintercalate lithium ions. The positive active material may include a composite oxide including at least one selected from cobalt, manganese, and nickel, as well as lithium. In particular, the following compounds may be used: $Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $LiE_{2-b}R_bO_{4-c}D_c$ ($0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_\alpha$($0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}$ ($0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 \leq \alpha \leq 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$.); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$.); $Li_aNiG_bO_2$ ($0.90 \leq a \leq 1.8$ and $0.001 \leq b \leq 0.1$.); $Li_aCoG_bO_2$ ($0.90 \leq a \leq 1.8$ and $0.001 \leq b \leq 0.1$.); $Li_aMnG_bO_2$ ($0.90 \leq a \leq 1.8$ and $0.001 \leq b \leq 0.1$.); $Li_aMn_2G_bO_4$ ($0.90 \leq a \leq 1.8$ and $0.001 \leq b \leq 0.1$.); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The compound may have a coating layer on the surface or be mixed with a compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compounds for a coating layer can be amorphous or crystalline. The coating element for a coating layer may include Mg, Al, Co, K, Na, Ca, Si, Ti, V, Sn, Ge, Ga, B, As, Zr, or a mixture thereof. The coating layer can be formed in a method having no negative influence on properties of a positive active material by including these elements in the compound. For example, the method may include any coating method such as spray coating, dipping, and the like but is not illustrated in more detail, since it is well-known to those who work in the related field.

The positive active material layer may include a binder and a conductive material.

The binder improves binding properties of the positive active material particles to one another and to a current collector. Examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of a negative electrode. Any electrically conductive material may be used as a conductive agent, unless it causes a chemical change. For example, it may include natural graphite, artificial graphite, carbon black, acetylene black, ketjen black, carbon fiber, metal powder, metal fiber or the like such as copper, nickel, aluminum, silver or the like, or one or at least one kind of mixture of conductive material such as polyphenylene derivative or the like.

The current collector may be aluminum (Al), but is not limited thereto.

The negative electrode 112 and positive electrode 114 may be manufactured in a method of mixing the active material, a conductive material, and a binder with an active material composition and coating the composition on a current collector, respectively. The electrode-manufacturing method is well known and thus, is not described in detail in the present specification. The solvent may include N-methylpyrrolidone and the likeDeletedTextsbut is not limited thereto.

The electrolyte is the same as described in above.

According to the kind of rechargeable lithium battery, a separator 113 may be interposed between the positive electrode 114 and the negative electrode 112. The separator 113 may include polyethylene, polypropylene, polyvinylidene fluoride, or a multilayer of two or more layers thereof, and it may also include a mixed multilayer such as a polyethylene/polypropylene 2-layered separator, a polyethylene/ polypropylene/polyethylene 3-layered separator, a polypropylene/polyethylene/polypropylene 3-layered separator, or the like.

Hereinafter, the embodiments are illustrated in more detail with reference to examples. However, the following are example embodiments and are not limiting.

Example 1

Positive active material slurry was prepared by mixing a positive active material prepared by mixing $LiCoO_2$ as and $Li(Ni_{1/3}CO_{1/3}Mn_{1/3})O_2$ in a weight ratio of 7:3, polyvinylidene fluoride (PVDF) as a binder, and carbon as a conductive material in a weight ratio of 92:4:4 and adding N-methyl-2-pyrrolidone thereto. The positive active material slurry was coated on a 20 μm-thick aluminum film as a current collector, dried in a vacuum oven, and compressed, fabricating a positive electrode.

In addition, negative active material slurry was prepared by mixing crystalline artificial graphite as a negative active material and PVDF as a binder in a weight ratio of 92:8 and dispersing the mixture to N-methyl-2-pyrrolidinone. The negative active material slurry was coated on a 15 μm-thick copper film as a current collector, dried in a vacuum oven, and compressed, fabricating a negative electrode.

Next, a 25 μm-thick porous polyethylene membrane as a separator was interposed between the positive and negative electrodes, fabricating an electrode assembly. The electrode assembly was spirally wound, compressed, and housed in a prismatic can. Then, a non-aqueous electrolyte was prepared by adding 10 wt % of ethylacetate (EA) and 1 wt % of trimethylsilyl borate (TMSB) to a mixed solvent prepared by mixing ethylenecarbonate (EC)/diethylcarbonate (DEC) in a volume ratio of 30:60) based on the total weight of the non-aqueous electrolyte and dissolving 1M $LiPF_6$ therein and injected into the can. The can was sealed to fabricate a rechargeable lithium battery cell.

Examples 2 to 18 and Comparative Examples 1 to 3

A rechargeable lithium battery cell was fabricated according to the same method as Example 1 except for using a non-aqueous electrolyte prepared by using the amount and composition provided in the following Table 1.

TABLE 1

| | Solvent (volume ratio) | Solvent having a low melting point (wt %) | $LiPF_6$ (M) | TMSB (wt %) |
|---|---|---|---|---|
| Example 1 | EC/DEC = 30:60 | EA 10 | 1.0 | 1 |
| Example 2 | EC/DEC = 30:40 | EA 30 | 1.0 | 1 |
| Example 3 | EC/DEC = 30:20 | EA 50 | 1.0 | 1 |
| Example 4 | EC = 30 | EA 70 | 1.0 | 1 |
| Example 5 | EC/DEC = 30:60 | EP 10 | 1.0 | 1 |
| Example 6 | EC/DEC = 30:40 | EP 30 | 1.0 | 1 |
| Example 7 | EC/DEC = 30:20 | EP 50 | 1.0 | 1 |
| Example 8 | EC/DEC = 30 | EP 70 | 1.0 | 1 |
| Example 9 | EC/DEC = 30:20 | EA 50 | 1.0 | 0.1 |
| Example 10 | EC/DEC = 30:20 | EA 50 | 1.0 | 0.5 |
| Example 11 | EC/DEC = 30:20 | EA 50 | 1.0 | 2 |
| Example 12 | EC/DEC = 30:20 | EA 50 | 1.0 | 3 |
| Example 13 | EC/DEC = 30:20 | MA 50 | 1.0 | 1 |
| Example 14 | EC/DEC = 30:20 | PA 50 | 1.0 | 1 |
| Example 15 | EC/DEC = 30:20 | BA 50 | 1.0 | 1 |
| Example 16 | EC/DEC = 30:20 | MP 50 | 1.0 | 1 |
| Example 17 | EC/DEC = 30:20 | PP 50 | 1.0 | 1 |
| Example 18 | EC/DEC = 30:20 | BP 50 | 1.0 | 1 |

TABLE 1-continued

| | Solvent (volume ratio) | Solvent having a low melting point (wt %) | $LiPF_6$ (M) | TMSB (wt %) |
|---|---|---|---|---|
| Comparative Example 1 | EC/DEC/EMC = 30:20:50 | — | 1.0 | — |
| Comparative Example 2 | EC/DEC/EMC = 30:20:50 | — | 1.0 | 1 |
| Comparative Example 3 | EC/DEC = 30:20 | EA 50 | 1.0 | — |

In Table 1, EC is ethylenecarbonate, DEC is diethylcarbonate, EMC is ethylmethylcarbonate, EA is ethylacetate, EP is ethyl propionate, MA is methyl acetate, PA is propyl acetate, BA is butyl acetate, BP is butyl propionate, PP is propyl propionate, and TMSB is trimethylsilyl borate.

Figure 2:
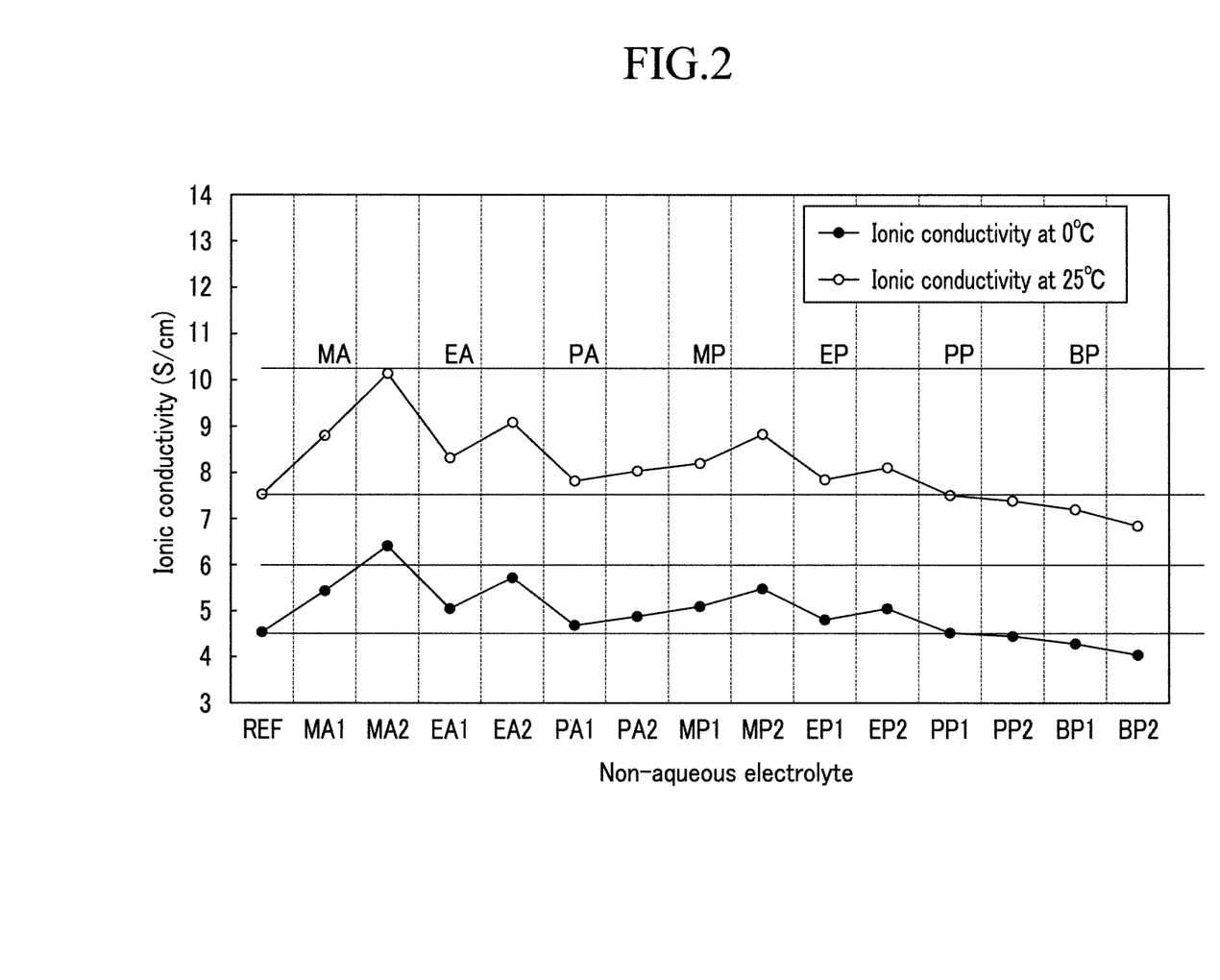
FIG. 2 is a graph showing ion conductivity examined at 0° C. and 25° C., while various solvents having a low melting point are added to an EC/EMC/DEC mixed solvent including 1M $LiPF_6$.

Table 2 and FIG. 2 show the melting points of the solvents according to Examples and Comparative Examples.

TABLE 2

| Solvent | Melting point (° C.) |
|---|---|
| EC(ethyl carbonate) | 36 |
| PC(propyl carbonate) | −48 |
| DMC(dimethyl carbonate) | 3 |
| EMC(ethylmethyl carbonate) | −15 |
| DEC(methylethyl carbonate) | −43 |
| EA(ethyl acetate) | −84 |
| MA(methyl acetate) | −94 |
| PA(propyl acetate) | −93 |
| BA(butyl acetate) | −78 |
| EP(ethyl propionate) | −73 |
| MP(methyl propionate) | −87 |
| PP(propyl propionate) | −76 |
| BP(butyl propionate) | −74 |

FIG. 2 shows ion conductivity (mS/cm) at 0° C. and 25° C. measured by adding various solvents having a low melting point in an amount provided in the following Table 3 based on the total weight of the non-aqueous electrolyte to a mixed solvent of EC/EMC/DEC (a mixing volume ratio=3:5:2) including 1M $LiPF_6$.

TABLE 3

| Electrolyte | $LiPF_6$ | EC/EMC/DEC a mixed solvent (mixed volume ratio) | Additive (wt %) |
|---|---|---|---|
| REF | 1M | 3:5:2 | — |
| MA1 | 1M | 3:5:2 | 10 |
| MA2 | 1M | 3:5:2 | 20 |
| EA1 | 1M | 3:5:2 | 10 |
| EA2 | 1M | 3:5:2 | 20 |
| PA1 | 1M | 3:5:2 | 10 |
| PA2 | 1M | 3:5:2 | 20 |
| MP1 | 1M | 3:5:2 | 10 |
| MP2 | 1M | 3:5:2 | 20 |
| EP1 | 1M | 3:5:2 | 10 |
| EP2 | 1M | 3:5:2 | 20 |
| PP1 | 1M | 3:5:2 | 10 |
| PP2 | 1M | 3:5:2 | 20 |
| BP1 | 1M | 3:5:2 | 10 |
| BP2 | 1M | 3:5:2 | 20 |

Experimental Example

The rechargeable lithium battery cells according to Examples and Comparative Examples were evaluated regarding capacity at a low temperature of −20° C. and −30° C. and cycle-life characteristic at room temperature after 500 cycles. The results are provided in the following Table 4. In addition, the rechargeable lithium battery cells according to Comparative Examples 2 and 3 and Example 3 were measured regarding capacity at a low temperature of −20° C. and −30° C. The results are provided in FIGS. 3 and 4. The low temperature capacity was measured by activating rechargeable lithium battery cells according to Examples and Comparative Examples through formation charge and discharge, charging them under a CC-CV condition of a current of 400 mA and a charge voltage of 4.35V voltage, being allowed to stand and frozen at −20° C. and −30° C. respectively for 2 hours chamber, and being discharged at 1 C down to 2.75V.

In addition, the cycle-life characteristic was evaluated as a ratio of discharge capacity after 500 cycles related to initial discharge capacity by charging the rechargeable lithium battery cells under a CC-CV condition of 1 C and a charge voltage of 4.2V or 4.35V for 2 hours and 30 minutes and discharging them with a cut-off of 1 C and 3.2V as one cycle and repeating the cycle 500 times at room temperature (24 to 25° C.).

TABLE 4

|  | −20° C. discharge capacity (%) | −30° C. discharge capacity (%) | Cycle-life characteristic after 500 cycles at room temperature (%) |
| --- | --- | --- | --- |
| Example 1 | 42 | 7 | 88 |
| Example 2 | 47 | 9 | 88 |
| Example 3 | 50 | 15 | 87 |
| Example 4 | 53 | 14 | 82 |
| Example 5 | 38 | 5 | 89 |
| Example 6 | 40 | 7 | 87 |
| Example 7 | 45 | 12 | 85 |
| Example 8 | 47 | 15 | 85 |
| Example 9 | 45 | 2 | 83 |
| Example 10 | 43 | 8 | 84 |
| Example 11 | 48 | 17 | 84 |
| Example 12 | 51 | 15 | 81 |
| Example 13 | 45 | 10 | 85 |
| Example 14 | 44 | 10 | 82 |
| Example 15 | 44 | 7 | 80 |
| Example 16 | 43 | 7 | 83 |
| Example 17 | 40 | 5 | 80 |
| Example 18 | 41 | 5 | 80 |
| Comparative Example 1 | 12 | 0 | 88 |
| Comparative Example 2 | 15 | 0 | 89 |
| Comparative Example 3 | 40 | 0 | 80 |

Figure 3:
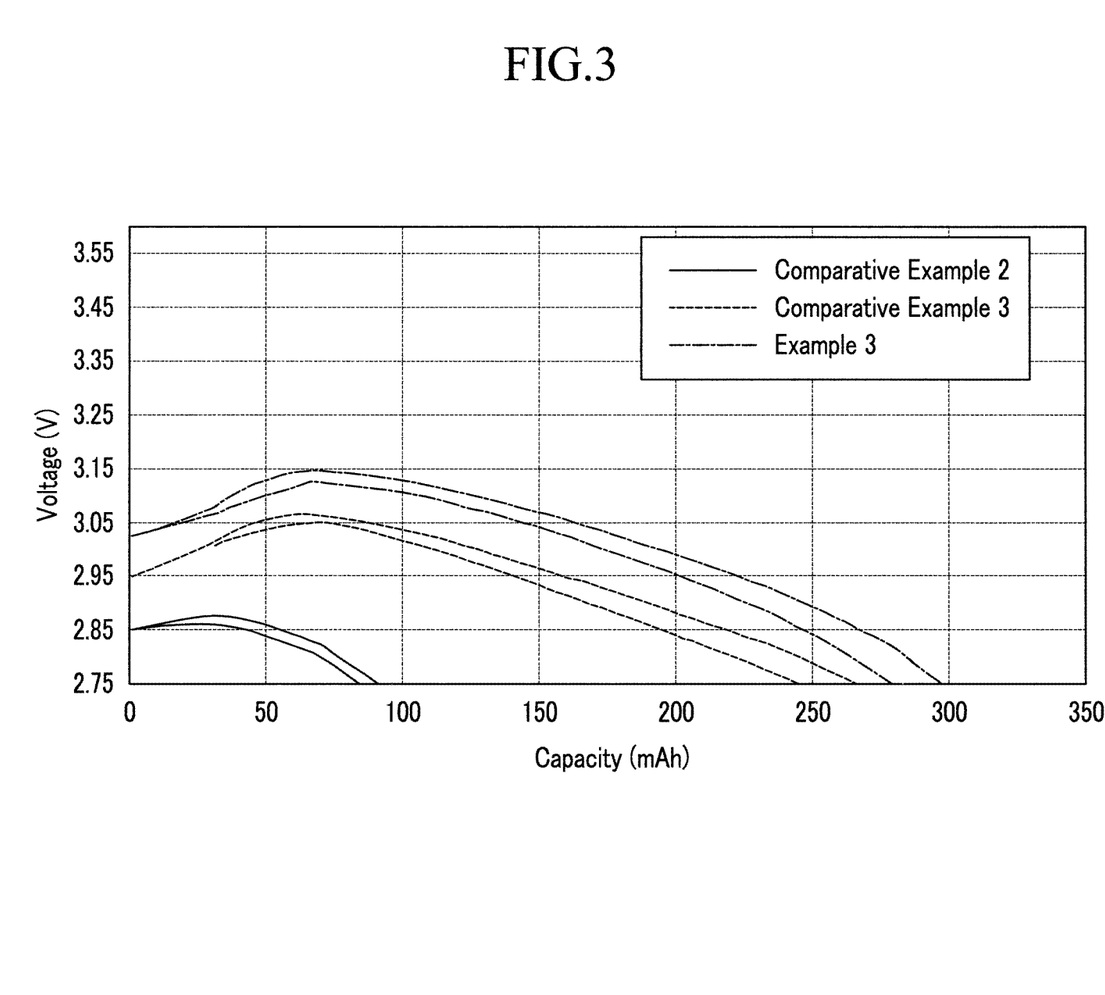
FIG. 3 is a graph showing discharge capacity of the rechargeable lithium battery cells according to Example 3 and Comparative Examples 2 and 3 at −20° C.
Figure 4:
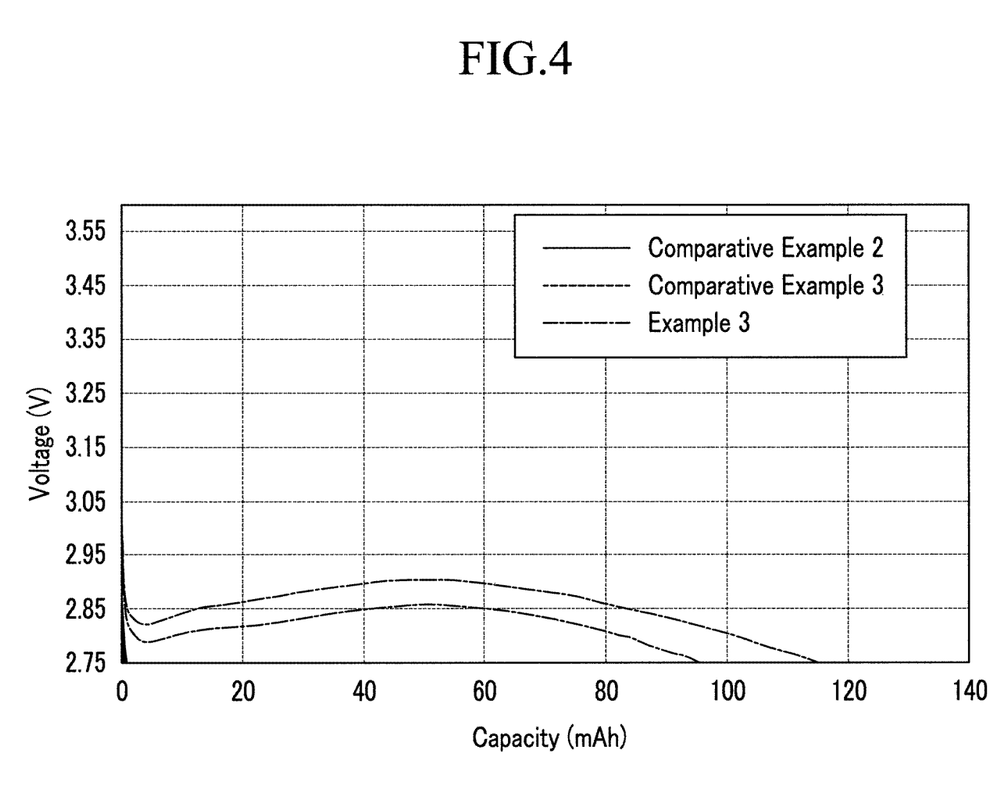
FIG. 4 is a graph showing discharge capacity of the rechargeable lithium battery cells according to Example 3 and Comparative Examples 2 and 3 at −30° C.

As shown in Table 4 and FIGS. 3 and 4, the rechargeable lithium battery cells according to Examples 1 to 18 had excellent discharge capacity at a low temperature and simultaneously, excellent cycle-life characteristic at room temperature compared with the ones according to Comparative Examples 1 to 3.

While these embodiments have been described in connection with what is presently considered to be practical example embodiments, it is to be understood that the present embodiments are not limited to the disclosed embodiments, but, on the contrary, is intended to cover various modifications and equivalent arrangements included within the spirit and scope of the appended claims.

What is claimed is:

1. A non-aqueous electrolyte for a rechargeable lithium battery comprising:
   a lithium salt;
   a non-aqueous organic mixture; and
   an additive,
   wherein the additive consists essentially of trialkylsilyl borate at a concentration of at least about 1 wt %, and the non-aqueous organic mixture includes at least one of ethyl propionate and ethyl acetate in an amount of about 50 wt % to about 70 wt % based on the total weight of the non-aqueous organic mixture.

2. The non-aqueous electrolyte of claim 1, wherein the non-aqueous mixture comprises an alkylacetate, an alkylpropionate, or a mixture thereof.

3. The non-aqueous electrolyte of claim 1, wherein the non-aqueous mixture comprises methylacetate, ethylacetate, propylacetate, butylacetate, dimethylacetate, methylpropionate, ethylpropionate, propylpropionate, butylpropionate, or a mixture thereof.

4. The non-aqueous electrolyte of claim 1, wherein the non-aqueous mixture comprises methylacetate, ethylacetate, propylacetate, butylacetate, dimethylacetate, or a mixture thereof.

5. The non-aqueous electrolyte of claim 1, wherein the non-aqueous mixture comprises methylpropionate, ethylpropionate, propylpropionate, butylpropionate, or a mixture thereof.

6. The non-aqueous electrolyte of claim 1, wherein the non-aqueous mixture comprises ethylacetate, ethylpropionate, or a mixture thereof.

7. The non-aqueous electrolyte of claim 1, wherein the trialkylsilyl borate is trimethylsilyl borate.

8. The non-aqueous electrolyte of claim 1, wherein the trialkylsilyl borate is included in an amount of about 1 wt % to about 5 wt % based on the total weight of the non-aqueous electrolyte.

9. The non-aqueous electrolyte of claim 1, wherein the trialkylsilyl borate is included in an amount of about 1 wt % to about 3 wt % based on the total weight of the non-aqueous electrolyte.

10. A rechargeable lithium battery comprising a non-aqueous electrolyte comprising:
    a lithium salt;
    a non-aqueous organic mixture; and
    an additive,
    wherein the additive consists essentially of trialkylsilyl borate at a concentration of at least about 1 wt %, and the non-aqueous organic mixture comprises at least one of ethyl propionate and ethyl acetate in an amount of about 50 wt % to about 70 wt % based on the total weight of the non-aqueous organic mixture.

11. The rechargeable lithium battery of claim 10, wherein the non-aqueous mixture comprises an alkylacetate, an alkylpropionate, or a mixture thereof.

12. The rechargeable lithium battery of claim 10, wherein the non-aqueous mixture comprises methylacetate, ethylacetate, propylacetate, butylacetate, dimethylacetate, methylpropionate, ethylpropionate, propylpropionate, butylpropionate, or a mixture thereof.

13. The rechargeable lithium battery of claim 10, wherein the non-aqueous mixture comprises methylacetate, ethylacetate, propylacetate, butylacetate, dimethylacetate, or a mixture thereof.

14. The rechargeable lithium battery of claim 10, wherein the non-aqueous mixture comprises methylpropionate, ethylpropionate, propylpropionate, butylpropionate, or a mixture thereof.

15. The rechargeable lithium battery of claim 10, wherein the non-aqueous mixture comprises ethylacetate, ethylpropionate, or a mixture thereof.

16. The rechargeable lithium battery of claim 10, wherein the trialkylsilylborate is trimethylsilyl borate.

17. The rechargeable lithium battery of claim 10, wherein the trialkylsilyl borate is included in an amount of about 1 wt % to about 5 wt % based on the total weight of the non-aqueous electrolyte.

18. The rechargeable lithium battery of claim 10, wherein the trialkylsilyl borate is included in an amount of about 1 wt % to about 3 wt % based on the total weight of the non-aqueous electrolyte.

* * * * *